May 13, 1969 S. B. WILLIAMS 3,443,775
FLIGHT BELT
Filed June 23, 1965 Sheet 1 of 2
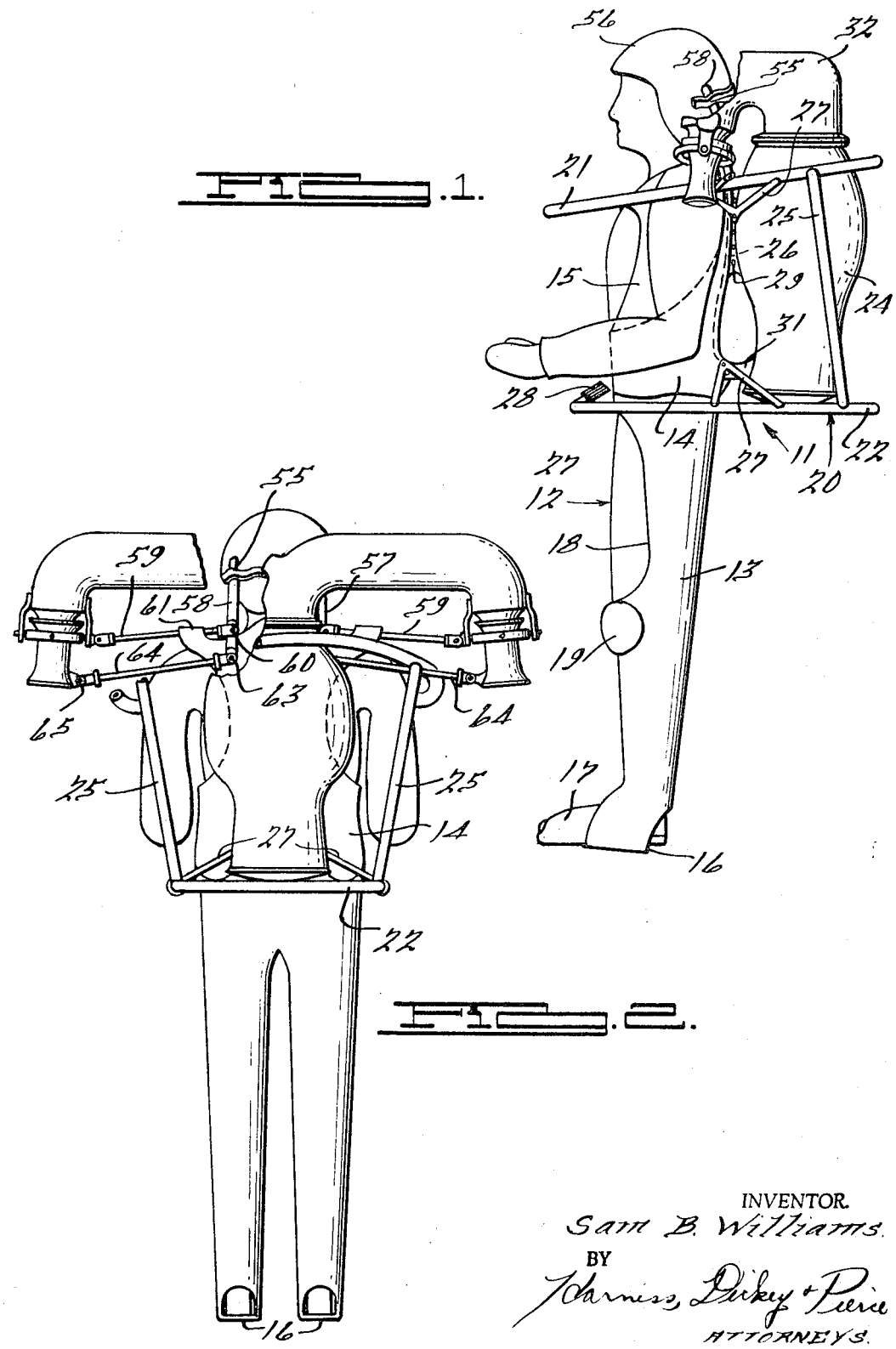
INVENTOR.
Sam B. Williams.
BY
Harness, Dickey & Pierce
ATTORNEYS.

May 13, 1969
S. B. WILLIAMS
3,443,775
FLIGHT BELT
Filed June 23, 1965
Sheet 2 of 2
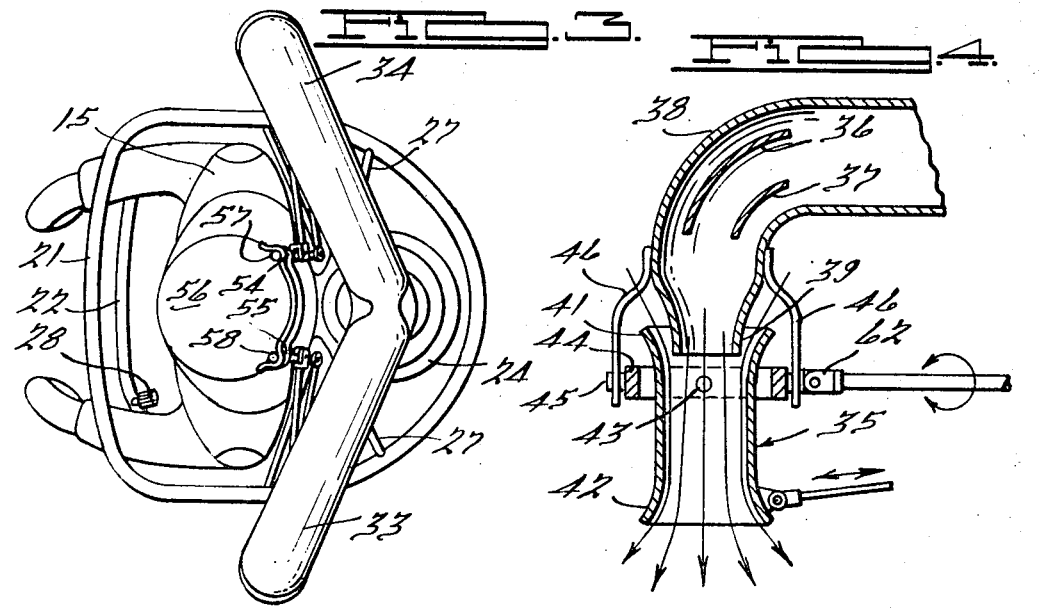
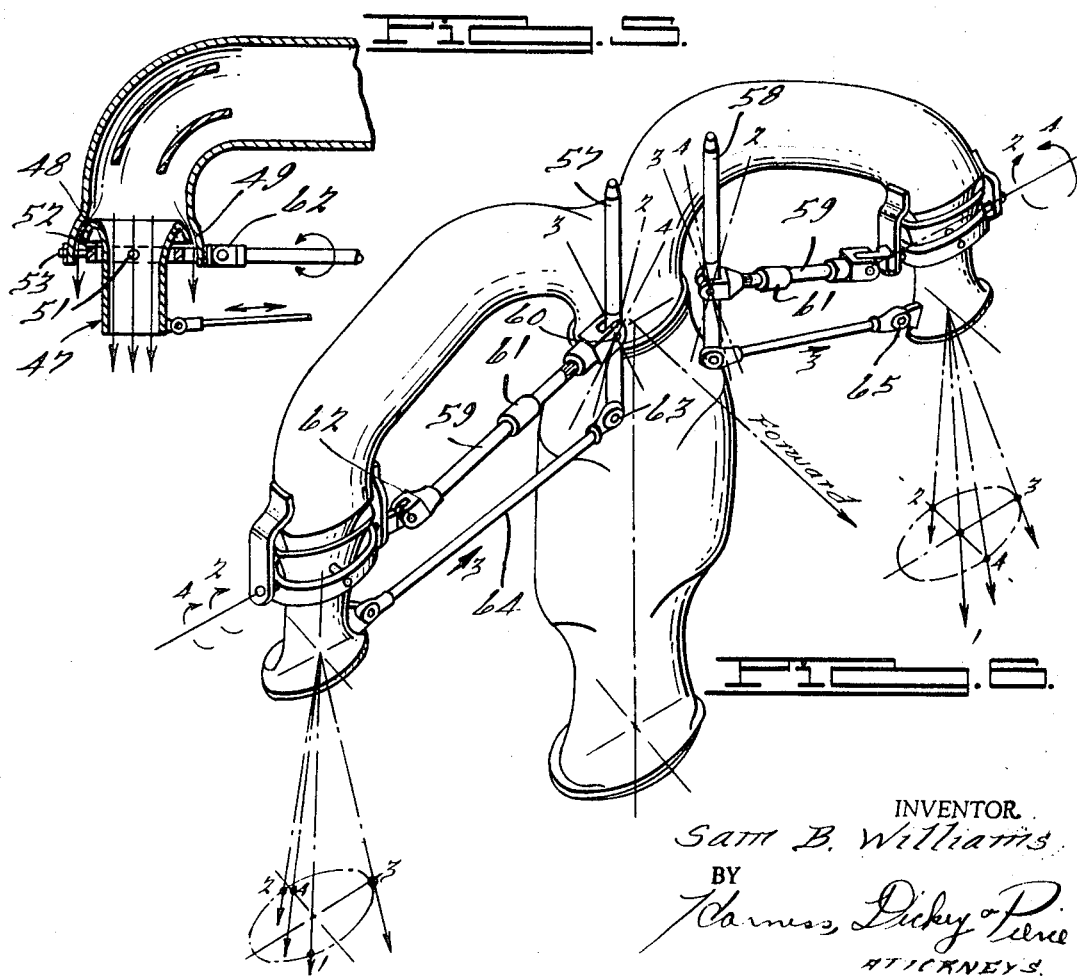
INVENTOR.
Sam B. Williams
BY
Harness, Dickey & Pierce
ATTORNEYS.

United States Patent Office 3,443,775
Patented May 13, 1969

3,443,775
FLIGHT BELT
Sam B. Williams, Walled Lake, Mich., assignor to Williams Research Corporation, Walled Lake, Mich., a corporation of Michigan
Filed June 23, 1965, Ser. No. 466,275
Int. Cl. B64d 25/06
U.S. Cl. 244—4     13 Claims

ABSTRACT OF THE DISCLOSURE

A flight belt having a gas turbine secured to a supporting garment, deflectors mounted on gimbal rings, and deflector controls actuated by movement of the pilot's head.

---

This invention relates to flight belts, and more particularly to the control, mounting and structural components of equipment which is harnessed to the back of an individual and permits him to elevate himself above the ground and travel through the air.

It is an object of the invention to provide novel and improved control, mounting and structural systems which are specially adapted for use with flight belts having turbojet engines.

It is another object to provide an improved flight belt of this type which includes a novel support system for the pilot permitting him to carry his own weight and that of the equipment more easily and naturally, thus reducing fatigue during flights of long duration, while permitting normal walking and complete leg freedom for landing on rough terrain.

It is a further object to provide an improved belt of this nature which includes a novel frame structure for support and protection in a variety of positions, and which also permits an infantryman in a prone position to crawl free of the equipment with ease.

It is another object to provide an improved flight belt mounting frame of this character which may be used to support various payloads, to mount weapons for firing, and to protect the pilot and system in event of a fall.

It is also an object to provide an improved flight belt having these characteristics, which includes a flight direction control system actuated by head movements of the pilot, thus utilizing his natural balancing movements and freeing his hands for other important activities.

It is a further object to provide a novel and improved jet deflector system for use with a flight belt which minimizes the necessary control forces, thus being particularly adaptable for head operated control systems, and retains relatively low velocities through most of the duct system, minimizing thrust losses.

Other objects, features and advantages of the present invention will become apparent from the subsequent description, taken in conjunction with the accompanying drawings.

In the drawings:

FIGURE 1 is a side elevational view of a pilot wearing the flight belt of this invention;

FIGURE 2 is a rear view of the pilot and flight belt;

FIGURE 3 is a top plan view of the pilot and flight belt;

FIGURE 4 is a cross-sectional view in elevation of an ejector type of a jet deflector;

FIGURE 5 is a cross-sectional view in elevation showing a modified form of deflector utilizing mating portions of spherical surfaces, and FIGURE 6 is a partially schematic perspective view showing the engine, bifurcated ducts and nozzles, together with the control linkage operable by head movement.

Briefly, the illustrated embodiment of the invention comprises a harness to be worn by the pilot, a tubular frame secured to said harness, a turbojet engine also mounted on the harness, a pair of bifurcated ducts extending angularly from said engine to opposite sides of the pilot's head, adjustable jet deflectors at the outlets of said ducts, and control linkages connected between the pilot's helmet and said deflectors for controlling their position.

The support garment worn by the pilot comprises stirrup pants, a corset and a vest, these components being interconnected to provide the principal support for the pilot to his feet and legs. The tubular frame structure comprises upper and lower members each of which encircles the pilot and engine, the frame being secured to a rigid backbone which is part of the corset. The engine is also secured directly to the corset backbone.

The assembly may be placed on the ground, resting on the lower frame member, and when the pilot, such as an infantryman, is in a prone position, the system is supported by the lower and upper frame members.

The head control system is combined with a suitable jet deflector nozzle arrangement at the outlets of bifurcated ducts which extend in cantilever fashion forwardly and to opposite sides of the pilot's head and shoulders. Two alternately usable jet deflector nozzle systems are shown, each of which comprises a tubular deflector nozzle gimbal-mounted at the exit of each of the two ducts. The need for close-fitting seals between these deflector nozzles and the ducts are eliminated, and the ducts augment the system thrust. In one case, this is done by an ejector action which increases the mass flow rate, and in a modified form the deflector nozzle has a narrower cross section, sharply accelerating the flow. In each instance, there are minimum flow losses since the gas velocity during approach the nozzle is relatively low.

The gimbal mounting of the deflector nozzle permits it to be pointed in a variety of directions forwardly, rearwardly and sidewardly. The head operated control system for these deflector nozzles comprises a torsion rod connected to each gimbal ring and a push-pull rod connected to the outer end of each nozzle. The two rods for each nozzle are connected to a control actuating lever, two such levers being provided. The upper ends of these levers are connected to loops on the pilot's helmet. The arrangement is such that forward tilting of the pilot's head will tilt the deflector nozzles rearwardly for forward flight. Rearward tilting of the pilot's head will result in rearward flight or pitch stabilization. Sideways head tilting provides for lateral translation or stability by causing sideways tilting of both nozzles. When the pilot twists his head, one nozzle will be tilted forwardly and the other rearwardly, providing yaw in the same direction as the head is rotated.

Referring more particularly to the drawings, the entire assembly is generally indicated at 11 and is worn by a pilot generally indicated at 12. The means for attaching assembly 11 to the pilot comprises a support garment including stirrup 13, a tight-fitting corset 14 and a vest 15 connected to corset 14. Stirrup pants 13 have lower portions 16 which support the pilot's feet 17, and openings 18 along the upper front portions of the legs which facilitate entry and exit from the garment. Protective knee pads 19 are also provided on the legs.

The stirrup pants are permanently secured to the lower portion of the semi-rigid corset 14, which surrounds the mid-portion of the pilot's body. Vest 15 is permanently attached to the corset back and the upper edge of the corset which surrounds the waist. The vest functions in the manner of shoulder straps so that a pilot, unassisted, can support the entire assembly 11 upon his shoulders while he is buckling on the corset. The vest also provides some control of the equipment in case the corset becomes unbuckled inadvertently during flight. Stirrup pants 13 also assist in this safety role.

The stirrup pants will permit normal walking and complete leg freedom for landing on rough terrain. During flight, the pilot 12 will hold his legs straight to allow the stirrup pants to function in tension as foot stirrups. This will have a tendency to cause a moderate force to close the legs of the stirrup pants which are in tension. Auxiliary adjusting straps (not shown) could be included to permit adjustment of the effective length of the stirrup pants as well as the vest.

The tubular frame structure is indicated generally at 20 and comprises an upper frame member 21 and a lower frame member 22. These frame members encircle the upper portion of the pilot's body, being spaced from the pilot, as seen best in FIGURE 2. The rear portion of each frame member is curved and extends a sufficient distance rearwardly to enclose a turbojet engine 24. The forward portions of the frame members are only slightly curved, and extend a sufficient distance forwardly of the pilot's body to enable him to lie in a prone position on the ground with the entire assembly supported by the frame, in a manner described below. The upper and lower frame members are interconnected by a pair of members 25, seen in FIGURE 3, disposed rearwardly of the pilot.

Corset 14 is provided with a rigid backbone 26, and frame 19 is secured to this backbone by struts 27 which extend inwardly behind the pilot from the sides of frame members 21 and 22. A thrust control twist grip or handle 28 is also provided on the front portion of frame member 22. Handle 28 extends upwardly and rearwardly in an inclined manner so that frame member 22 will protect it from damage during landing.

The axis of engine 24 is approximately parallel to the back of the pilot, and the engine is secured to backbone 26 of corset 14 by an upper connecting member 29 and a lower connecting member 31, seen in FIGURE 1. Inlet air flows into the bottom of the engine. A bifurcated outlet duct 32 extends upwardly from engine 24, and its branches 33 and 34 extend toward the opposite sides of the pilot's head, as seen in FIGURES 2 and 3. Duct portions 33 and 34 are rigid and of substantially inverted U-shape, their outer ends being approximately in line with the pilot, as seen in FIGURE 3, so that the nozzle lift thrust is aligned with the corset.

It will be noted that engine 24 is in effect rigidly connected to frame 19 through corset backbone 26. The frame will therefore serve to support the engine when the former is resting on the ground, regardless of whether it rests on lower frame member 22 or on the forward portions of both frame members. In the latter position, an infantryman may thus crawl out of the flight belt while in a prone position.

The two alternately usable means for controlling the jet direction from ducts 33 and 34 are shown in FIGURES 4 and 5 respectively. FIGURE 4 shows an ejector type of jet outlet deflector generally indicated at 35. This comprises a tubular member having a main cylindrical portion with a diameter similar to that of the duct, the latter having turning vanes 36 and 37 in its downwardly turned elbow 38, and a necked exit portion 39. Deflector 35 has an upper flared portion 41 and a lower flared portion 42, portion 41 surrounding exit 39 and in spaced relation therewith. The deflector is pivotally supported at 43 within a gimbal ring 44, the latter in turn being pivoted at 45 to a pair of downwardly extending brackets 46 on the duct. The axis of pivot 45 is at right angles to that of pivot 43, so that deflector 35 may be pointed in a variety of directions and rocked forwardly, rearwardly, sidewardly, or with a combination of such motions.

The annular space between exit 39 and portion 41 of deflector 35 will permit an ejector action to take place during operation of the unit, augmenting the thrust by increasing the mass flow rate. This will increase the system thrust or at least make up for losses caused by the obstruction inherent in a jet deflector. It should also be observed that there are no close fitting seals as are present in conventional tilting nozzles, and jamming due to the accumulation of foreign matter will therefore be avoided.

FIGURE 5 shows a jet deflector generally indicated at 47 having a main portion of cylindrical cross section and an upper portion 48 which is in the form of a reversely bent flange having a convex outer surface forming a portion of a sphere. This surface is complementary to the inner surface of an enlarged exit 49 formed at the outlet of the duct, and is disposed within portion 49 with a relatively large clearance, for example, ⅛ of an inch. The shapes of portion 48, 49, are such that the leakage path between the spherical surfaces is directed to produce useful thrust. The relatively large clearance will prevent malfunction due to dirt accumulation, as in the previous example. The cross-sectional area of the main portion of deflector 47 is substantially less than that of the duct so that flow is sharply accelerated. The nozzle will thus provide for directional control with minimum flow losses since, as in the previous example, the velocity approaching the exit of the duct is relatively low. Nozzle 47 is pivoted at 51 within a gimbal ring 52, the latter being pivoted at 53 to the interior of duct exit 49.

FIGURES 1 to 3 and 6 illustrate the novel head operated control system of the present invention. A pair of loops 54 and 55 are carried by helmet 56 approximately behind the ears of the pilot. These loops retain a pair of control levers 57 and 58, respectively, as seen in FIGURE 3. These levers are substantially parallel to the back of the pilot, and their upper ends are slidably retained by the loops. One end of a torsion rod 59 is connected at 60 to an intermediate portion of each lever 57 and 58, the torsion rod extending outwardly through a loop 61 above the pilot's shoulder, with the outer end of the rod being connected to pivot 45 or 53 by a universal joint 62. Connection 60 is a clevis type joint with a sliding spline leading to rod 59. Loop 61 constitutes a rotational bearing for the torsion rod as indicated schematically in FIGURE 6 and includes an axial end thrust bearing (not shown) rigidly attached to corset 14, so that each rod 59 may only rotate but may not move axially. Its rotation will therefore cause rotation of gimbal ring 44 or 52 on its respective pivot axis 45 or 53.

The lower end of each control lever 57 and 58 has a spherical connection 63 with one end of a push-pull rod 64. Rods 64 are disposed behind the shoulders of the pilot and extend outwardly therefrom, their outer ends having spherical connections 65 with the lower ends of deflectors 35 or 47. Pivoting of either control rod 57 or 58 about its pivotal connection 60 with torsion rod 59 will move the corresponding rod 64 axially, causing the deflector to rock about its pivot 43 or 51.

The operation of the head operated control system may be described with respect to partially schematic FIGURE 6. In this figure, reference numerals 1, 2, 3 and 4 are used to designate the deflector portions for four different head positions. Note that in this figure the direction of forward flight is downwardly and to the right.

The control linkage in FIGURE 6 is shown in its normal vertical thrust position which it will assume when the head of the pilot is erect. When the pilot's head is tilted forward, the outlet nozzles or deflectors will be tilted to the position designated at 2. This will result in forward flight. Rearward tilting of the head will similarly provide for rearward flight. These two last-mentioned head movements could also be used for pitch stabilization.

If the pilot tilts his head sideways, the parts will assume the position designated at 3. This will result in lateral translatory movement or may be used for lateral stability.

Twisting of the pilot's head will cause the parts to assume the positions indicated at 4. This differs from the previous positions in that the left and right hand outlet nozzles will not move the same way. More particularly, the left hand nozzle in FIGURE 6 will be tilted rearwardly while the right hand nozzle is tilted forwardly. This is because the head twisting will rotate one torsion rod 59 in one direction, the other torsion rod 59 in the opposite direction, as shown by the numbered arrows. This will provide yaw in the same direction as the pilot's head is rotated.

It will be observed that the control system and head deflector mountings described above offers a minimum amount of frictional resistance to the control movements, thus being especially adapted for control by head movement of the pilot.

What is claimed is:

1. In a flight belt, a support garment comprising stirrup pants having portions underlying the feet of the pilot, said stirrup pants having openings permitting the toes and heels of the pilot to project from said underlying portions to permit normal walking, openings along the upper portions of said stirrup pants facilitating entry and exit therefrom, a corset secured directly to the upper end of said stirrup pants and surrounding the upper portion of the pilot, and an engine disposed rearwardly of and secured directly to said corset at vertically spaced locations.

2. In a flight belt, a supporting garment comprising stirrup pants with portions underlying the feet of the pilot, a corset secured to the upper end of said stirrup pants and surrounding the body of the pilot below the shoulders, a vest secured to said corset and overlying the shoulders of the pilot, a rigid backbone for said corset and an engine secured to said backbone at vertically spaced locations.

3. The combination according to claim 2, further provided with a tubular frame structure comprising upper and lower frame members encircling the pilot and engine, interconnecting members between said upper and lower frame members, and means securing said frame members to said rigid corset backbone.

4. The combination according to claim 3, said last-mentioned means comprising struts extending inwardly from the sides of said frame members to said backbone.

5. The combination according to claim 3, said lower frame member being flat and disposed below the lowermost portion of the engine, whereby said lower frame member may rest on the ground, the forward portions of said frame member being spaced a sufficient distance forwardly of said corset to permit the pilot to lay in a prone position with said engine being supported by said frame members through said rigid corset backbone.

6. In a control system for a gimbal-mounted flight belt jet deflector nozzle, a pilot helmet, a control lever having an end connected to said helmet, a first rod connected to said lever, means connecting said first rod to said nozzle whereby forward and rearward movement of the pilot's head will cause tilting of the nozzle in a fore-and-aft plane, a second rod connected to said lever, and means connecting said second rod to said nozzle whereby sideways movement of the pilot's head will cause tilting of the nozzle in a lateral direction.

7. The combination according to claim 6, said first rod comprising a torsion rod connected to one of the gimbal pivots, said second rod comprising a push-pull rod connected to said nozzle at a point spaced from said gimbal mounting.

8. The combination according to claim 7, said torsion rod connected to said nozzle at a point spaced from said lever, said push-pull rod being connected to the end of said lever opposite its connection with said helmet.

9. In a control system for the deflector nozzles of a flight belt having an engine with a bifurcated duct and downwardly directed duct exits at opposite sides of the pilot's head, a gimbal mounting for each of said deflector nozzles, a pilot helmet, a pair of control levers having corresponding ends connected to said helmet, a torsion rod connected to an intermediate portion of each of said control levers, means connecting each torsion rod to its corresponding deflector nozzle whereby forward and rearward movement of the pilot's head will cause tilting of the deflector nozzles in a fore-and-aft plane, push-pull rods connected to the other corresponding ends of said control levers, each push-pull rod being connected to its corresponding deflector nozzle, and means movably supporting said deflector nozzles, said last-mentioned means being responsive to rotation of its connected torsion rod to move the deflector nozzle in a fore-and-aft plane and responsive to axial movement of said push-pull rod to move the deflector nozzle in a lateral plane.

10. In a control system for the deflector nozzles of a flight belt having an engine with a bifurcated duct and downwardly directed duct exits at opposite sides of the pilot's head, gimbal mountings for said deflector nozzles, each gimbal mounting having a first pivotal axis extending in the direction in which the pilot faces and a second pivotal mounting at right angles to said first direction, a pilot helmet, a pair of control levers disposed at the rear of said helmet and on opposite sides thereof, means on said helmet retaining the upper ends of said control levers, torsion rods connected to intermediate portions of said control levers and also connected to the second gimbal pivot mountings which extend at right angles to the direction in which the pilot faces, and push-pull rods connected between the lower ends of said control levers and the lower ends of said deflector nozzles, whereby axial movement of said push-pull rods will cause rocking of the deflector nozzles about said first pivotal axis.

11. The combination according to claim 10, said torsion rods having clevis type sliding spline connections with said control levers and universal joint connections with said second pivotal mountings.

12. In a jet deflector construction for a flight belt engine of the type having a bifurcated duct with downwardly directed exits at opposite sides of the pilot, a tubular main cylindrical portion on said deflector, a flared upper portion in overlapping relation with the exit of a duct, a gimbal ring surrounding and pivotally supporting said tubular member, and means on said duct exit pivotally supporting said gimbal ring for rotation on an axis at right angles to said first-mentioned pivot, the spacing between the overlapping portions of said duct exit and tubular member being sufficient to permit substantial flow of air in an axial direction and to prevent the accumulation of foreign matter, said duct exit being substantially narrower in cross section than the main portion of said duct, said overlapping portion of the tubular deflector member surrounding said duct exit, whereby an ejector action will take place with air drawn through the annular space between the overlapping portions of the duct exit and tubular member.

13. In a jet deflector construction for a flight belt engine of the type having a bifurcated duct with downwardly directed exits at opposite sides of the pilot, a tubular main cylindrical portion on said deflector, a flared upper portion in overlapping relation with the exit of a duct, a gimbal ring surrounding and pivotally supporting said tubular member, and means on said duct exit pivotally supporting said gimbal ring for rotation on an axis at right angles to said first-mentioned pivot, the spacing between the overlapping portions of said duct exit and tubular member being sufficient to permit substantial flow of air in an axial direction and to prevent the accumulation of foreign matter, said duct exit having an enlarged portion with an inner surface forming a portion of a spherical surface, the overlapping portion of said tubular member comprising a reversely bent flange having an outer surface complementary to and spaced inwardly from the inner surface of said duct exit, the cross-sectional area of said tubular member being substantially less than the cross-sectional area of said duct.

References Cited

UNITED STATES PATENTS

| | | | |
|---|---|---|---|
| 2,472,839 | 6/1949 | Kramer | 60—232 |
| 2,640,549 | 6/1953 | Isacco | 244—4 X |
| 3,050,938 | 8/1962 | Twyford | 239—265.35 |
| 3,149,799 | 9/1964 | Hulbert | 244—4 |

FOREIGN PATENTS 673,964    4/1939    Germany.

MILTON BUCHLER, *Primary Examiner.*

T. W. BUCKMAN, *Assistant Examiner.*